Aug. 20, 1946.  J. H. O'NEIL  2,406,159
STATIONARY SCRAPER ON SOLDER ROLL
Filed Dec. 10, 1943
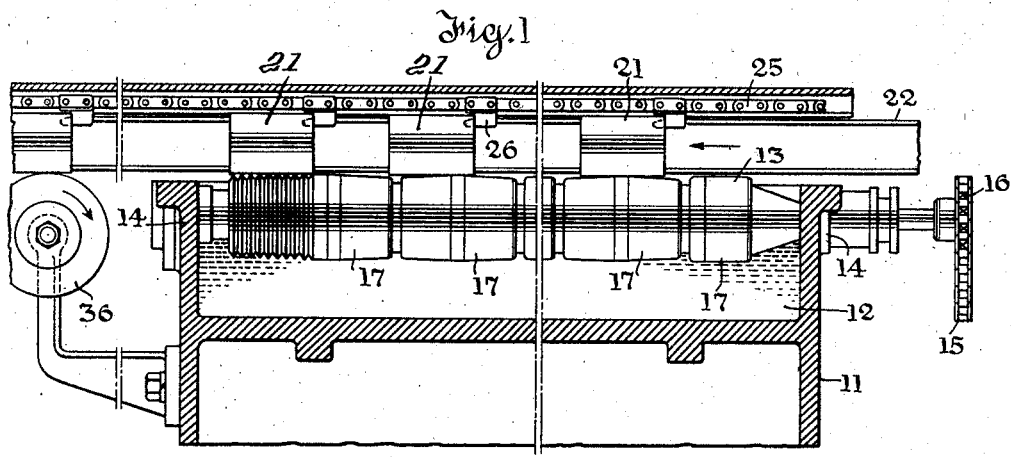
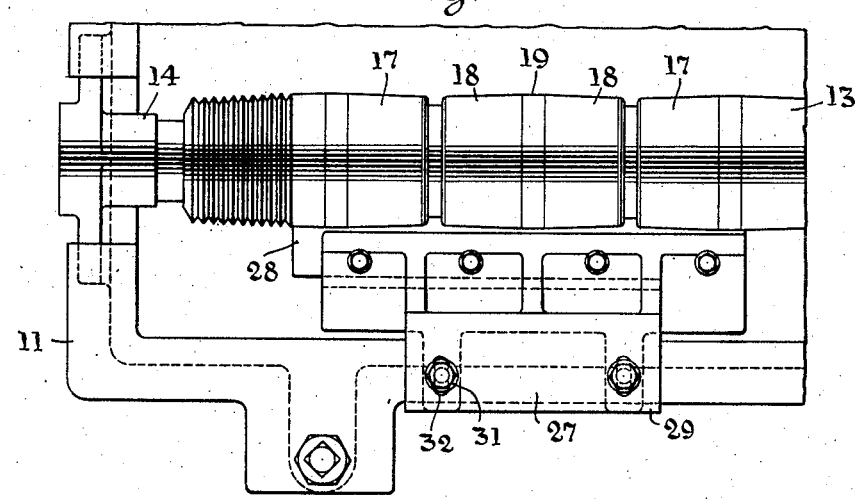
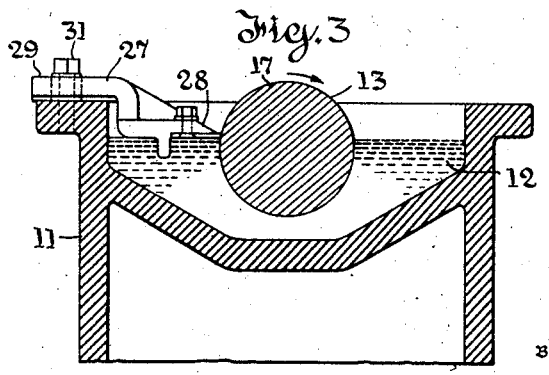
Inventor
James H. O'Neil
By Mason, Porter & Diller
Attorneys

UNITED STATES PATENT OFFICE 2,406,159

STATIONARY SCRAPER ON SOLDER ROLL

James H. O'Neil, Syracuse, N. Y., assignor to Continental Can Company, Inc., New York, N. Y., a corporation of New York Application December 10, 1943, Serial No. 513,762

1 Claim. (Cl. 113—62)

This invention relates to new and useful improvements in a soldering mechanism for applying solder to the side seam of a can body.

An object of the invention is to provide a soldering mechanism wherein the solder applying roll is equipped with means for stripping solder from the side seam and returning it to the solder bath.

In the drawing:

Figure 1 is a longitudinal sectional view through a soldering bath showing a solder roll having the improvements applied thereto;

Figure 2 is an enlarged partial plan view of the improvements applied to the solder roll;

Figure 3 is a sectional view of the solder bath and roller; and

Figure 4 is a sectional detail view through the side seam of a can body.

The invention has to do with the soldering mechanism for applying solder to the side seam of a can body. A great deal of difficulty has been experienced in the wiping of the side seam due to the fact that the solder is thrown by the wiper into the can body, which is objectionable, especially in can bodies having the interior enameled. This is due in part to the presence of surplus solder adhering to the can body along the side seam which is removed by the wiper. The present invention resides in an improved form of solder applying and stripping mechanism wherein the solder is more uniformly distributed along the side seam and the surplus solder is more efficiently stripped from the side seam before the can body contacts the wiper. This invention contemplates providing the solder roll which rotates in the solder bath and applies the solder to the side seam with a wiper or "doctor" at one or more sections. The doctor is positioned near the end of the solder roll and performs the dual function of removing the excess solder from the side seam and assisting in sweating the solder into the side seam.

Referring specifically to the drawing for a detailed description of the invention, the solder-applying mechanism includes a suitable frame 11 which provides a heated solder bath 12. The details of the solder bath and the manner of heating the solder form no part of the present invention and have been omitted from the drawing.

Mounted for rotation in the solder bath is a solder-applying roll 13 which is journaled in suitable bearings 14 carried by the frame 11. A sprocket chain 15 running over a suitable sprocket wheel 16 on the roll 13 rotates the roll in the direction of the arrow in Fig. 3. The solder roll includes several sections, all of which are alike, these sections being indicated by the numeral 17. Each section 17 has tapered surfaces 18, 18 which meet at the center in a section 19 as best shown in Fig. 2. These surfaces merge and provide a surface which contacts the side seams of the can bodies. The can bodies are indicated at 21 in the drawing. The can body is guided through an outside horse which includes the usual right- and left-hand sections, one of which is indicated at 23. These sections of the horse are spaced at the lower side, so that a side seam 24 of the can body will be exposed and caused to contact the solder-applying roll. The can bodies are moved through the horse by a feed chain 25 which is provided with a series of dogs 26 that engage the can bodies and move the same along the soldering roll in proper timed relation to each other. This means for feeding the can bodies and presenting the same to the solder roll is of a well-known construction and requires no further description herein.

The novel feature of the present invention resides in the provision of a scraper or doctor, generally indicated at 27, which scrapes off substantially all the tin or solder on the last few can-contacting sections 17 of the roll. The scraper includes a scraping member 28 attached to a support 29 which is fastened to the solder bath frame 11 by bolts 31. Elongated slots 32 through which the bolts 31 extend provide for adjustment of the position of the scraper member 28 so that it always just contacts the sections 17 of the roll.

The can body passes over the roll in the direction of the arrow in Fig. 1, that is, from right to left. The side seam 24 of the can body 21 contacts the sections 17 of the roll and at the first part of the bath, the sections 17, although covered with solder and heated by the solder, apply very little solder to the seam because the can body is cold. However, the can body is heated and, as it travels to succeeding sections 17 of the roll, solder from the sections 17 adheres to the can body and sweats into the seam 24. When the can bodies reach the sections 17 which are stripped of solder by the scraper member 28, said sections perform the dual function of further sweating the solder into the seam and of reclaiming solder adhering to the can body along the side seam. The hot surface of the solder roll section contacting with the side seam and moving across the same picks up the solder on the face of the can body and returns the reclaimed solder to the bath.

When the can body leaves the solder roll, it contacts a wiper 36, which is of usual construction and rotates in the direction of the arrow in Fig. 1. Since a large portion of the excess solder has been removed from the side seam 24, there is very little chance that solder will be thrown into the traveling can bodies by the wiper.

It is obvious that many changes may be made in the details of construction without departing from the spirit of the invention as set forth in the appended claim.

Having thus described the invention, what is claimed as new and desired to be secured by Letters Patent is:

A soldering mechanism for applying solder to the side seam of can bodies comprising a solder bath containing molten solder, a solder applying roll partially immersed in the solder bath and rotating therein, means for feeding can bodies along said roll with the side seam contacting with said roll so that solder carried by the roll will be applied to the side seam, said roll having a series of sections for applying solder to the side seam and a series of similar sections at the delivery end of the bath for removing solder adhering to the face of the can body in the region of the seam, a scraper blade lengthwise of said last-named sections and contacting therewith above the solder bath for stripping the solder adhering to the surface of the sections therefrom as they emerge from the bath and before they contact with the can body at the side seam, whereby surplus solder adhering to the surface of the side seam will be taken therefrom by said last-named solder roll sections and returned to the bath.

JAMES H. O'NEIL.